(12) United States Patent
Nagamine

(10) Patent No.: US 7,581,145 B2
(45) Date of Patent: Aug. 25, 2009

(54) INFORMATION PROCESSING DEVICE, FAILURE NOTIFICATION METHOD, AND COMPUTER PRODUCT

(75) Inventor: Kazuaki Nagamine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 377 days.

(21) Appl. No.: 11/498,854

(22) Filed: Aug. 4, 2006

(65) Prior Publication Data
US 2007/0223917 A1 Sep. 27, 2007

(30) Foreign Application Priority Data
Mar. 24, 2006 (JP) .............................. 2006-083939

(51) Int. Cl.
*G06F 11/00* (2006.01)
(52) U.S. Cl. ....................................................... 714/48
(58) Field of Classification Search ................ 714/4, 714/15, 16, 18, 20, 21, 39, 47, 48, 51, 57
See application file for complete search history.

(56) References Cited

U.S. PATENT DOCUMENTS

| | | | |
|---|---|---|---|
| 5,959,969 A * | 9/1999 | Croslin et al. ............... 370/216 |
| 6,023,772 A * | 2/2000 | Fleming ........................ 714/13 |
| 6,775,238 B1 * | 8/2004 | Suzuki ........................ 370/242 |
| 7,076,688 B2 * | 7/2006 | Yamamoto ..................... 714/6 |
| 7,285,928 B1 * | 10/2007 | Jolly et al. .................. 318/280 |
| 2004/0221204 A1 * | 11/2004 | Johnson ....................... 714/47 |
| 2004/0250029 A1 * | 12/2004 | Ji et al. ....................... 711/162 |
| 2005/0108389 A1 * | 5/2005 | Kempin et al. .............. 709/224 |

FOREIGN PATENT DOCUMENTS

JP 2003-152722 5/2003

* cited by examiner

*Primary Examiner*—Nadeem Iqbal
(74) *Attorney, Agent, or Firm*—Fujitsu Patent Center

(57) ABSTRACT

When a primary failure occurs, each agent device (information processing device) checks itself to determine whether non-notification setting has been performed for alarm notification of the primary failure. If no non-notification setting has been performed, the agent device sends the alarm notification to a manager device (network management device). At the same time, the agent device sends a set alarm mask request to the agent device located downstream in the signal flow to request to perform non-notification setting for alarm notification of a secondary failure caused by the primary failure.

9 Claims, 12 Drawing Sheets

FIG.3

| TYPE | A | B | C | D | E |
|---|---|---|---|---|---|
| LOS | ○ | ○ | × | ○ | × |
| BDI | ○ | ○ | × | ○ | × |
| AIS-O | ○ | ○ | × | × | × |
| EQPT-O | ○ | ○ | × | × | × |
| CTNEQ | ○ | ○ | × | × | × |
| T-TEMP | ○ | × | ○ | ○ | × |
| T-OPR | ○ | × | × | × | × |
| T-OPT | ○ | × | ○ | ○ | × |

FIG.4

| ATTRIBUTE TYPE OF DOWNSTREAM PACKAGE | ALARM MASK TYPE | | | | |
|---|---|---|---|---|---|
| | A | B | C | D | E |
| ATTRIBUTE TYPE X | MASK TYPE TO BE INDICATED TO DOWNSTREAM PACKAGE:TYPE D | MASK TYPE TO BE INDICATED TO DOWNSTREAM PACKAGE:TYPE B | MASK TYPE TO BE INDICATED TO DOWNSTREAM PACKAGE:TYPE D | MASK TYPE TO BE INDICATED TO DOWNSTREAM PACKAGE:TYPE A | MASK TYPE TO BE INDICATED TO DOWNSTREAM PACKAGE:TYPE C |
| ATTRIBUTE TYPE Y | MASK TYPE TO BE INDICATED TO DOWNSTREAM PACKAGE:TYPE D | MASK TYPE TO BE INDICATED TO DOWNSTREAM PACKAGE:TYPE D | MASK TYPE TO BE INDICATED TO DOWNSTREAM PACKAGE:TYPE D | MASK TYPE TO BE INDICATED TO DOWNSTREAM PACKAGE:TYPE A | MASK TYPE TO BE INDICATED TO DOWNSTREAM PACKAGE:TYPE C |
| ATTRIBUTE TYPE Z | MASK TYPE TO BE INDICATED TO DOWNSTREAM PACKAGE:TYPE C | MASK TYPE TO BE INDICATED TO DOWNSTREAM PACKAGE:TYPE E | MASK TYPE TO BE INDICATED TO DOWNSTREAM PACKAGE:TYPE A | MASK TYPE TO BE INDICATED TO DOWNSTREAM PACKAGE:TYPE D | MASK TYPE TO BE INDICATED TO DOWNSTREAM PACKAGE:TYPE E |

FIG.5

| TYPE | A | B | C | D | E | |
|---|---|---|---|---|---|---|
| LOS | ○ | ○ | × | ○ | × | ⎫ |
| BDI | ○ | ○ | × | ○ | × | ⎪ |
| AIS-O | ○ | ○ | × | × | × | ⎪ |
| EQPT-O | ○ | ○ | × | × | × | ⎬ IN-PACKAGE MASK DATA |
| CTNEQ | ○ | ○ | × | × | × | ⎪ |
| T-TEMP | ○ | × | ○ | ○ | × | ⎪ |
| T-OPR | ○ | × | × | × | × | ⎪ |
| T-OPT | ○ | × | ○ | ○ | × | ⎭ |
| DOWN STREAM PKG #3 | AGENT #3 TYPE D | AGENT #3 TYPE D | AGENT #3 TYPE D | AGENT #3 TYPE A | AGENT #3 TYPE C | ⎫ INTER-PACKAGE MASK DATA |
| DOWN STREAM PKG #2 | NO AGENT TYPE A | NO AGENT TYPE B | NO AGENT TYPE D | NO AGENT TYPE D | NO AGENT TYPE E | ⎭ |

INFORMATION PROCESSING DEVICE, FAILURE NOTIFICATION METHOD, AND COMPUTER PRODUCT

BACKGROUND OF THE INVENTION

1. Field of the Invention

The present invention generally relates to a technology for sending a notification to a network management device when a failure is detected in a network. More particularly, the present invention relates to preventing overloading of the network management device with regard to failure monitoring.

2. Description of the Related Art

Existing failure monitoring systems employ a network management device for managing a failure that occurs in any information processing device in a network. In such a failure monitoring system, the network management device receives a failure notification from an information processing device in which a failure is detected, and outputs the failure notification to a monitor, etc. to inform a network administrator of the failure.

Generally, failure in one information processing device leads to failure in other information processing devices in the same network. Therefore, several failure notifications may be output to the monitor due to the same. failure, which makes it difficult to pinpoint the information processing device in which the primary failure occurred.

A conventional technology to solve this problem is disclosed in, for example, Japanese Patent Laid-Open Publication No. 2003-152722. According to the conventional technology, a master-slave relationship is established among information processing devices. When receiving failure notifications from both master and slave information processing devices due to the same failure, the network management device does not allow the failure notification from the slave information processing device to be output to the monitor so that only the failure notification from the master information processing device is displayed.

Similarly, in, for example, a Wavelength Division Multiplexing (WDM) device used in an optical network, a plurality of information processing devices (hereinafter, "agent device"), each with a central processing unit (CPU), are interconnected by an internal Local Area Network (LAN). The agent devices send a failure notification (hereinafter, "alarm notification") to an internal LAN managing device (hereinafter, "manager device") connected to the internal LAN.

The manager device designates the one among alarm notifications that needs to be reported as a failure notification based on alarm mask condition (hereinafter, "alarm masking") maintained beforehand, and sends the failure notification to the monitor. The term "alarm mask condition" as used herein refers to a prerequisite for identifying the source of failure based on correlation of the alarm notifications.

FIG. 12 is a schematic for explaining failure monitoring in a conventional WDM device. A WDM device 10 is connected to a monitor 20 via an external LAN 30, to other optical transmission devices by an optical network 40, and to other WDM devices by a WDM network 50. The WDM device 10 includes a manager device 11, and agent devices 12 to 14 connected via an internal LAN 15.

The agent devices 12 to 14 are connected by an optical fiber cable 16. Each of the agent devices 12 to 14 includes a CPU and is capable of operating autonomously. Each of the agent devices 12 and 13 has installed thereon an optical amplification/dispersion compensation package, a DEMUX/MUX package for demultiplexing/multiplexing optical signals, and an optical switch package. The agent device 14 has installed thereon a transponder package that performs wavelength conversion of optical signals input to and output from the WDM device 10. The WDM device 10 functions as a single optical transmission device due to the autonomous execution of the various program packages by the agent devices 12 to 14.

Each of the agent devices 12 to 14 periodically monitors itself to check for any failure, and if a failure is detected, sends an alarm notification to the manager device 11. The manager device 11 collects alarm notifications sent from the agent devices 12 to 14, and sends a failure notification to the monitor 20 after alarm masking. For example, as shown in FIG. 12, when a failure occurs in the agent device 14 (primary alarm) and this leads to failure in the agent devices 12 and 13 (secondary alarm), the manager device 11 receives an alarm notification from each of the agent devices 12 to 14. After performing alarm masking based on the alarm mask condition maintained beforehand, the manager device 11 sends a failure notification (in this example, a notification of the failure of the source of failure, agent device 14) to the monitor 20.

However, in the conventional failure monitoring system described above, the manager device (network management device) collects alarm notifications (failure notifications) issued by the agent devices (information processing device) in the network, and performs alarm masking. Consequently, load for failure monitoring concentrates on the managing device.

Further, when the packages installed on the agent devices are upgraded, or when dynamic switching of Label Switch Path (LSP), such as MultiProtocol Label Switching (MPLS) or Generalized Multi-Protocol Label Switching (GMPLS), is carried out by a Label Switch-router (LSR), it is necessary to change the alarm mask condition maintained beforehand by the manager device. In addition, packages on the manager device need to be upgraded. During the upgrading process, the manager device is disconnected from the monitor, and the monitoring of the network is temporarily interrupted.

SUMMARY OF THE INVENTION

It is an object of the present invention to at least partially solve the problems in the conventional technology.

According to an aspect of the present invention, an information processing device in a network, in which a plurality of information processing devices and a network management device are connected to one another, sends a failure notification to the network management device when a failure occurs, includes a non-notification setting checking unit that, upon occurrence of a primary failure, checks whether non-notification setting has been performed for the primary failure; a failure notification forwarding unit that sends a failure notification to the network management device when the non-notification setting checking unit determines that the non-notification setting has not been performed; and a failure non-notification setting unit that, upon occurrence of the primary failure, performs-non-notification setting for a secondary failure, caused by the primary failure, in another information processing device located downstream of a signal flow in the network.

According to another aspect of the present invention, a failure notification method is applied to an information processing device in a network in which a plurality of information processing devices and a network management device are connected to one another, and the information processing device sends a failure notification to the network management device when a failure occurs. The failure notification method includes checking, upon occurrence of a primary failure, whether non-notification setting has been performed for the primary failure; sending a failure notification to the network management device when the non-notification setting has not been performed; and performing, upon occurrence of the primary failure, non-notification setting for a secondary failure, caused by the primary failure, in another information processing device located downstream of a signal flow in the network.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of an alarm mask template stored in an alarm-hierarchy data table;

FIG. 4 is an example of alarm mask setting data stored in an alarm-correlation data table;

FIG. 5 is an example of alarm mask data stored in an alarm mask table;

DETAILED DESCRIPTION OF THE PREFERRED EMBODIMENTS

Exemplary embodiments of the present invention are explained below with reference to the accompanying drawings. In the following explanation, the present invention is applied to information processing devices that form the functional part of a WDM device. For example, a manager device corresponds to a network management device, and an agent device corresponds to an information processing device.

Figure 1:
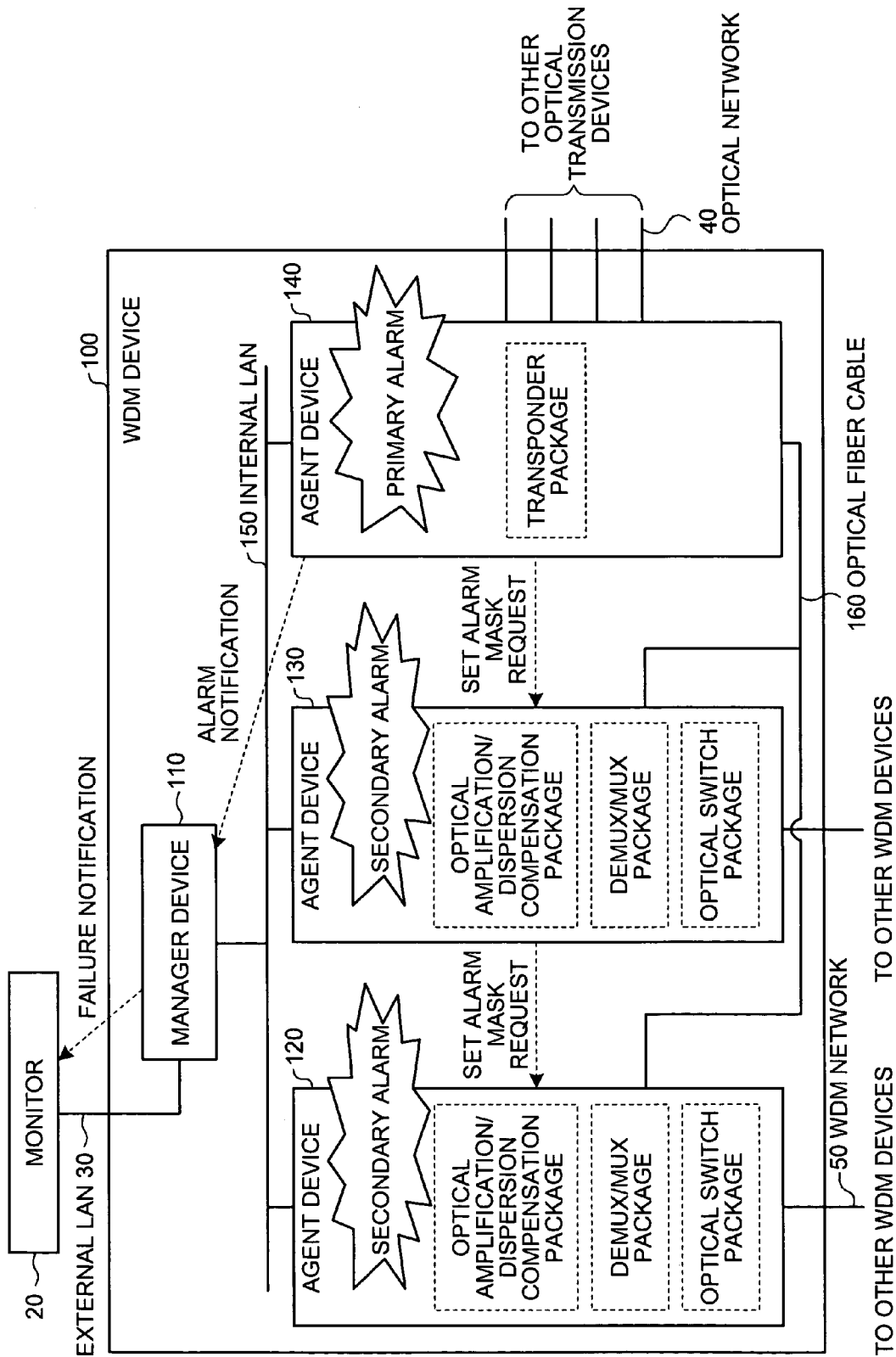
FIG. 1 is a schematic for explaining an overview of an agent device according to an embodiment of the present invention.

An overview of the agent device according to an embodiment of the present invention is given first. FIG. 1 is a schematic for explaining the overview of the agent device. A WDM device 100 is connected to the monitor 20 via the external LAN 30, to the other optical transmission devices via the optical network 40, and to the other WDM devices via the WDM network 50. The WDM device 100 includes a manager device 110 and agent devices 120 to 140. The manager device 110 and the agent devices 120 to 140 are connected via an internal LAN 150.

The agent devices 120 to 140 are connected by an optical fiber cable 160. Each of the agent devices 120 to 140 has a CPU and is capable of autonomous operation. Each of the agent devices 120 and 130 is installed with an optical amplification/dispersion compensation package, a DEMUX/MUX package for demultiplexing/multiplexing optical signals, and an optical switch package. The agent device 140 has installed thereon a transponder package that performs wavelength conversion of the optical signals input to and output from the WDM device 100. The WDM device 100 functions as a single optical transmission device due to the autonomous execution of the various program packages by the agent devices 120 to 140.

Each of the agent devices 120 to 140 periodically monitors itself to check for any failure, and if a failure (primary failure) is detected, checks whether setting (non-notification setting) has been performed not to send an alarm notification for the failure (failure notification). If no non-notification setting has been performed, the agent devices 120 to 140 send an alarm notification to the manager device 110.

Based on the topology of the internal LAN 150 obtained when the agent devices 120 to 140 are activated, each of the agent devices 120 to 140 further sends a Set alarm mask request to the agent device executing a package downstream to a package executed by itself in the signal flow within the WDM device 100. The Set alarm mask request is an instruction to the agent device to perform non-notification setting for alarm notification of failure (secondary failure) caused by the failure detected in itself. The agent device that receives the Set alarm mask request performs non-notification setting for the alarm notification of the secondary failure. The package located downstream of the signal flow is hereinafter referred to as downstream package, while the one located upstream as upstream package.

The manager device 110 receives the alarm notification from each of the agent devices 120 to 140, and based on the alarm notification, sends the failure notification to the monitor 20.

If we assume that the agent devices 120 and 130 are installed with downstream packages with respect to a package installed on the agent device 140, and that a failure (primary alarm) occurs in the agent device 140, the agent device 140 sends an alarm notification to the manager device 110 and, at the same time, sends a Set alarm mask request to the agent devices 120 and 130. Accordingly, the agent devices 120 and 130 perform non-notification setting for alarm notification of failure instructed by the Set alarm mask request.

Thus, even though a failure (secondary alarm) occurs in the agent devices 120 and 130 due to the failure in the agent device 140, alarm notifications of the failure are not sent to the manager device 110. The manager device 110 only receives the alarm notification from the agent device 140, and sends the failure notification of the agent device 140 to the monitor 20.

Thus, when a primary failure is detected, each of the agent devices 120 to 140 according to the embodiment checks itself to determine whether non-notification setting has been performed for alarm notification of the primary failure, and sends the alarm notification to the manager device 110 if it is determined that no non-notification setting has been performed. In addition, each of the agent devices 120 to 140 in which the primary failure occurred sends a Set alarm mask request to the agent device that is located downstream to itself in the signal flow, requesting the agent device to perform non-notification setting for alarm notification of a secondary failure caused in the agent device by the primary failure. Thus, alarm masking, conventionally performed by the manager device 110, is performed autonomously and in a decentralized manner by the agent devices 120 to 140 connected via the internal LAN 150. As a result, overloading of the manager device 110 with regard to failure monitoring can be prevented.

For simplicity, only three agent devices 120 to 140 are shown in the WDM device 100. The WDM device 100 generally includes a plurality of agent devices.

Figure 2:
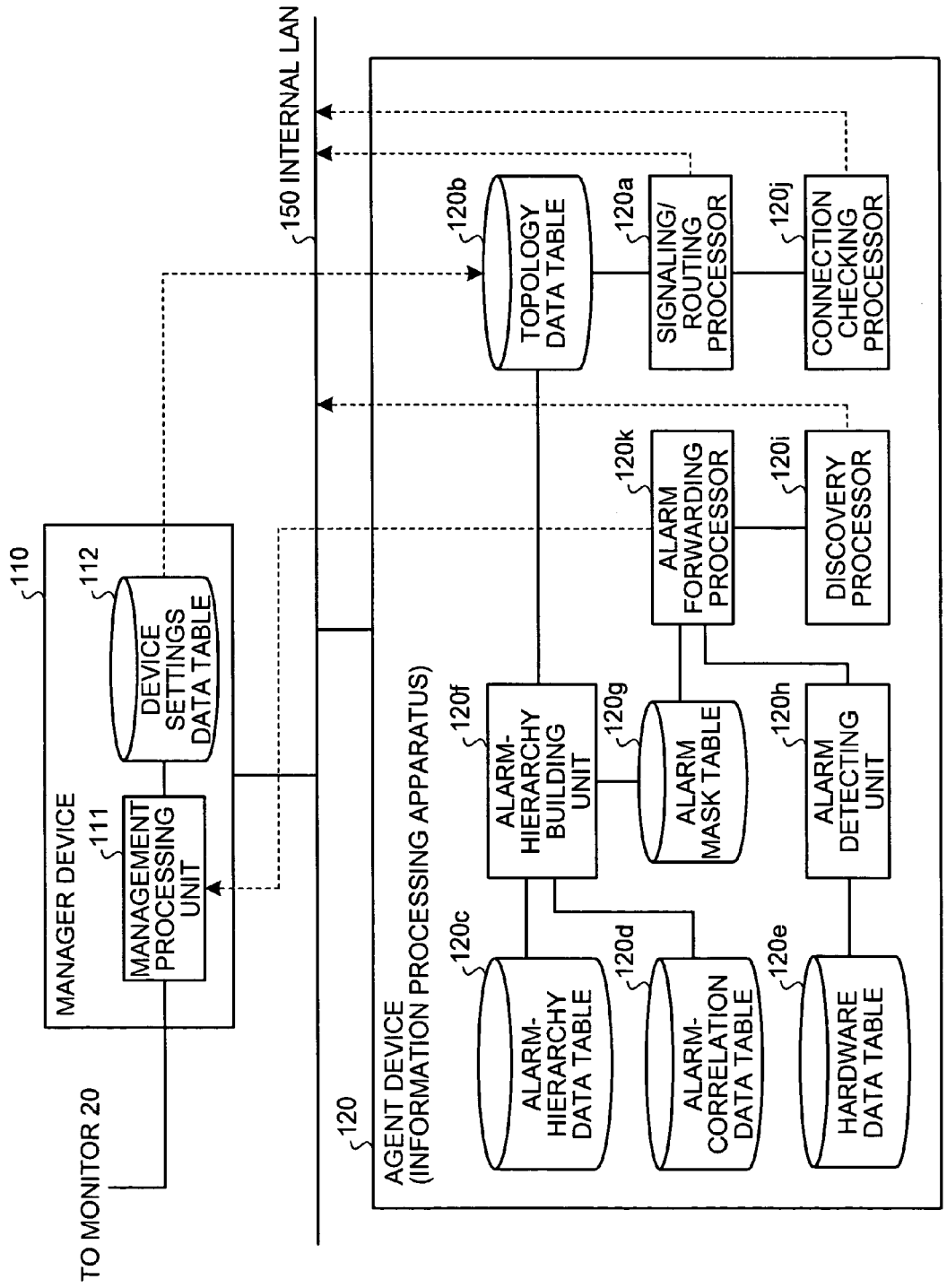
FIG. 2 is a functional block diagram of the agent device shown in FIG. 1.

A configuration of the agent device according to the embodiment is explained next. FIG. 2 is a functional block diagram of the agent device 120. FIG. 2 also shows a configuration of the manager device 110 of the WDM device 100. The configuration of the agent devices 130 and 140 is identical to that of the agent device 120.

The agent device includes various functional parts (not shown) such as CPU, and is installed with the optical amplification/dispersion compensation package, the DEMUX/MUX package, and the optical switch package to play a predetermined role as one functional part of the WDM device 100. The agent device 120 is connected to the manager device 110 via the internal LAN 150.

The manager device 110 includes a management processing unit 111 and a device settings table 112. The management processing unit 111 receives an alarm notification from each of the agent devices 120 to 140 in the WDM device 100, and, based on the received alarm notification, sends a failure notification to the monitor 20. The device settings table 112 is a storage unit that stores therein device settings such as fiber connection information, and path information. The fiber connection information includes data indicating connection status between the packages installed on each agent device in the WDM device 100. The path information includes data pertaining to an external interface of the packages installed on each agent device.

The agent device 120 includes a signaling/routing processor 120*a*, a topology data table 120*b*, an alarm-hierarchy data table 120*c*, an alarm-correlation data table 120*d*, a hardware data table 120*e*, an alarm-hierarchy building unit 120*f*, an alarm mask table 120*g*, an alarm detecting unit 120*h*, a discovery processor 120*i*, a connection checking processor 120*j*, and an alarm forwarding processor 120*k*.

The signaling/routing processor 120*a* obtains the topology data by signaling with the other agent devices connected via the internal LAN 150, and stores the retrieved topology data in the topology data table 120*b*. The signaling/routing processor 120*a* operates when the agent device 120 is activated, and when the connection checking processor 120*j* confirms a change in the connection status of the agent device 120.

Specifically, the signaling/routing processor 120*a* retrieves the fiber connection information and the path information from the device settings table 112 of the manager device 110. The signaling/routing processor 120*a* then compares the retrieved fiber connection data with connection data on the optical fiber cable actually connected to the package installed on the agent device 120 to check for any faulty connections by a predetermined method corresponding to the package.

For example, the signaling/routing processor 120*a* detects a faulty connection between packages each having a Synchronous Optical NETwork (SONET) frame as the end frame by a faulty connection detecting function that uses a j0 flag in the header or overhead portion of the frame. In the case of packages each having a G709 frame (a frame in a communication system defined by International Telecommunication Union-Telecommunication Standardization Sector (ITU-T) Recommendation G.709) as the end frame, the signaling/routing processor 120*a* detects a faulty connection by a faulty connection detecting function that uses a Trial Trace Identifier (TTI). Between a WDM package and a transponder package, the signaling/routing processor 120*a* detects a faulty connection by implementing an optical spectrum analysis module and checking whether expected light is being input.

Upon determining that there are no faulty connections in the connection status of optical fibers, the signaling/routing processor 120*a* establishes connections to other agent devices using a routing protocol such as Open Shortest Path First-Traffic Engineering (OSPF-TE), etc. for a network employing Generalized Multi-protocol label switching (GMPLS). Thereby, the signaling/routing processor 120*a* obtains data on the topology of the control plane, and stores the topology data in the topology data table 120*b*. The topology of the control plane is a topology where the CPU in the agent device is considered as a node. The topology data of the control plane includes a router ID assigned to a connecting member in the agent device to connect to the optical network, and a link identifier.

After obtaining the topology data of the control plane, the signaling/routing processor 120*a* checks the external interface data contained in the path information obtained from the manager device 110. If, among the packages installed on the agent device 120, there is a package containing an interface that inputs optical signals from an external optical transmission device outside the WDM device 100, the signaling/routing processor 120*a* determines that the agent device 120 is located at the topmost position in the signal flow of optical signals in the WDM device 100. Based on the topology data of the control plane stored in the topology data table 120*b*, the signaling/routing processor 120*a* sends a request message (hereinafter, "path message") including attribute data of the package installed on the agent device 120 to the agent device installed with the downstream package using a signaling protocol such as resource ReSerVation. Protocol-Traffic Engineering (RSVP-TE) for a network using GMPLS.

If, among the packages installed on the agent device 120, there is a package containing an interface that outputs optical signals to the external optical transmission device outside the WDM device 100, the signaling/routing processor 120*a* determines that the agent device 120 is located at the bottommost position in the signal flow of optical signals in the WDM device 100, and waits for a path message from another agent device. When receiving a path message from another agent device, the signaling/routing processor 120*a* sends a response message (hereinafter, "resv message") including the attribute data of the package installed on the agent device 120 to the agent device that sent the path message.

If the agent device 120 is neither at the topmost nor the bottommost, the signaling/routing processor 120*a* waits for either a path message or a resv message from another agent device. If receiving a path message, the signaling/routing processor 120*a* sends the path message including the attribute data of the package installed on the agent device 120 to the agent device installed with the downstream package. If receiving a resv message, the signaling/routing processor 120*a* sends the resv message including the attribute data of the package installed on the agent device 120 to the agent device installed with the upstream package.

When sending and receiving the path message and resv message, the signaling/routing processor 120*a* stores the attribute data of the package attached to the path message and resv message as the topology data in the topology data table 120*b*. Thus, the agent devices can obtain and share the attribute data of all the packages in the signal flow. The process of signaling performed by the signaling/routing processor 120a will be described later.

The topology of the data plane obtained in this manner is a topology where each package in the signal flow is considered as a node. The topology data of the data plane includes the attribute data of the package installed on each agent device. Specifically, the attribute data includes installation location that indicates the location of a shelf or a slot where the package is installed, equipment attribute that indicates the type of a device (a network card, etc.) on which the package is installed, principal signal attribute that denotes the type of a principal signal used by the package, and connection attribute that indicates any redundant configuration.

Incidentally, the signaling/routing processor 120a corresponds to, for example, a connection status checking unit.

The topology data table 120b stores therein the topology data of the control plane and the topology data of the data plane obtained by the signaling/routing processor 120a.

The alarm-hierarchy data table 120c stores therein an alarm mask template, in which notification/non-notification setting is defined for each alarm notification, with respect to each package installed on the agent device 120. FIG. 3 is an example of the alarm mask template stored in the alarm-hierarchy data table 120c. Specifically, the alarm-hierarchy data table 120c includes the notification/non-notification setting data associated with the alarm mask type, and the alarm notification type.

For example, A, B, C, D, and E in FIG. 3 denote the alarm mask type. LOS, BDI, AIS-O, . . . , and T-OPT denote the alarm notification type. Y and N denote notification and non-notification setting for each alarm, respectively. In FIG. 3, for example, notification/non-notification setting for the alarm mask type B is set as Y (notify) for the alarm notification types LOS, BDI, AIS-O, EQPT-O, and CTNEQ, and is set as N (unnotify) for the alarm notification types T-TEMP, T-OPR, and T-OPT.

The alarm-correlation data table 120d stores therein alarm mask setting data to be indicated to each downstream package, which is based on the attribute of the downstream package, for each package installed on the agent device 120. FIG. 4 is an example of the alarm mask setting data stored in the alarm-correlation data table 120d. Specifically, the alarm-correlation data table 120d stores the alarm mask types indicated to each downstream package associated with the attribute type of the downstream package with respect to each alarm mask type.

In the example of FIG. 4, for the downstream package with the attribute type X, the alarm mask types D, B, D, A, and C are set to be indicated to the downstream package for the alarm mask type A, B, C, D, and E, respectively. For the downstream package with the attribute type Y, the alarm mask types D, D, D, A, and C are set to be indicated to the downstream package.

The hardware data table 120e stores therein identification data of the hardware in the agent device 120.

The alarm-hierarchy building unit 120f creates an alarm mask data including the alarm mask template stored in the alarm-hierarchy data table 120c with the alarm mask setting data indicated to each downstream package, and stores the alarm mask data in the alarm mask table 120g. The alarm-hierarchy building unit 120f operates on completion of the process to obtaining the topology data performed by the signaling/routing processor 120a when the agent device 120 is activated, and when the connection checking processor 120j confirms a change in the connection status of the agent device 120.

Specifically, the alarm-hierarchy building unit 120f first determines the attribute type of a downstream package based on the topology data of the data plane stored in the topology data table 120b. The attribute type is predetermined and associated with the installation location, the equipment attribute, the principal signal attribute, and the connection attribute included in the topology data of the data plane.

After determining the attribute type of the downstream package, the alarm-hierarchy building unit 120f refers to the alarm-correlation data table 120d based on the determined attribute type, and retrieves the alarm mask type to be indicated to the downstream package.

The alarm-hierarchy building unit 120f refers to the alarm-hierarchy data table 120c, retrieves the alarm mask template, creates the alarm mask data by attaching the alarm mask type to be indicated to the downstream package for each alarm mask type, and stores the created alarm mask data in the alarm mask table 120g. Of the created alarm mask data, the data (notification/non-notification setting data for each alarm notification) retrieved from the alarm mask template stored in the alarm-hierarchy data table 120c is hereinafter referred to as in-package mask data, and the data (alarm mask setting data to be indicated to the downstream package) retrieved from the alarm-correlation data table 120d is hereinafter referred to as inter-package mask data.

FIG. 5 is an example of the alarm mask data stored in the alarm mask table 120g. The alarm mask data in the example shown in FIG. 5 is created using the alarm mask template shown in FIG. 3 and the alarm mask setting data shown in FIG. 4 under the conditions that the downstream package is PKG #3, the agent device on which PKG #3 is installed is agent #3, and the attribute type of PKG #3 is Y.

In this case, the alarm-hierarchy building unit 120f creates the alarm mask data attached with the alarm mask types D; D, D, A, and C to be indicated to the downstream package PKG #3 for the alarm mask type A, B, C, D, and E, respectively (see the row for the downstream PKG #3 in FIG. 5). The alarm-hierarchy building unit 120f only creates as many alarm mask data as there are packages installed on the agent device 120.

The alarm mask table 120g stores-therein the alarm mask data created by the alarm-hierarchy building unit 120f. The alarm mask table 120g corresponds to, for example, a failure non-notification setting data storing unit.

The alarm detecting unit 120h periodically performs alarm polling based on hardware data stored in the hardware data table 120e, and checks whether a failure has occurred in any hardware in the agent device 120. If failure of hardware is detected, the alarm detecting unit 120h sends an alarm notification to the alarm forwarding processor 120k, and when the failure is restored, sends an alarm restoration notification to the alarm forwarding processor 120k.

The discovery processor 120i sends a Set alarm mask request received from the agent device installed with the upstream package to the alarm forwarding processor 120k, or, conversely, sends a Set alarm mask request issued by the alarm forwarding processor 120k to the agent device installed with the downstream package.

The connection checking processor 120j periodically checks the connection status of the agent device 120 with the other agent devices and the manager device 110. The connection checking processor 120j corresponds to, for example, a connection status change checking unit.

When an alarm is detected, the alarm forwarding processor 120k, performs an alarm mask setting process on the agent device 120 and the agent device installed with the downstream package based on the alarm mask data stored in the alarm mask table 120g. In addition, the alarm forwarding processor 120k sends an alarm notification to the manager device 110, and when the alarm is restored, performs an alarm mask canceling process on the agent device 120 and the agent device installed with the downstream package.

Specifically, upon receiving an alarm notification from the alarm detecting unit 120h, the alarm forwarding processor 120k refers to the alarm mask table 120g, and retrieves therefrom in-package mask data and inter-package mask data associated with the alarm mask type predefined for the detected alarm notification. Next, the alarm forwarding processor 120k performs notification/non-notification setting for the agent device 120 based on the in-package mask data, and then sends a Set alarm mask request including the alarm mask type to be indicated to the downstream package to the agent device installed with the downstream package based on the inter-package mask data.

Figure 6:
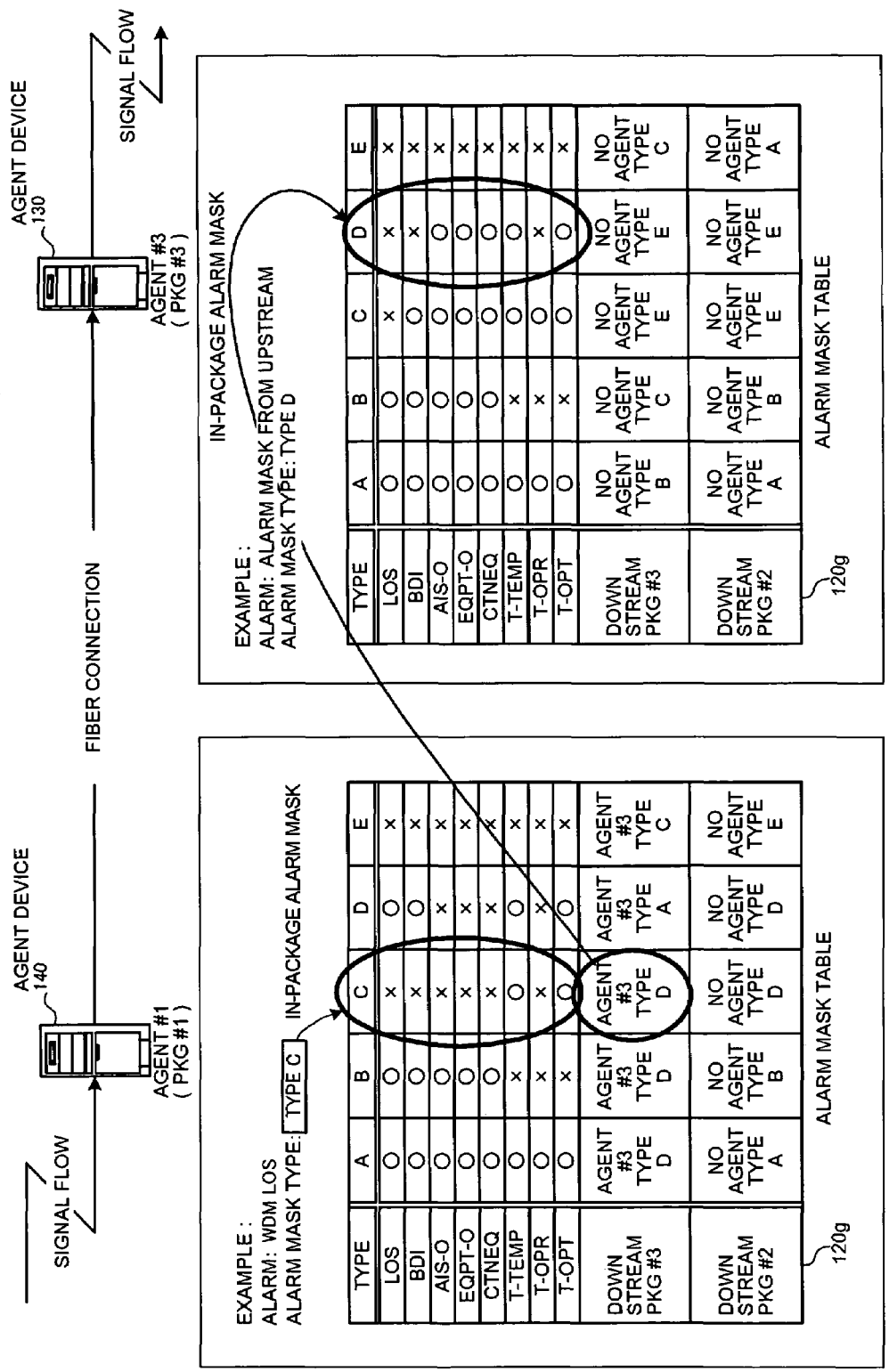
FIG. 6 is a schematic for explaining an alarm mask setting process performed by an alarm forwarding processor.

FIG. 6 is a schematic for explaining the alarm mask setting process performed by the alarm forwarding processor 120k. The agent device 140 (agent #1 in FIG. 6) and the agent device 130 (agent #3 in FIG. 6) are connected, wherein the agent device 130 is located downstream to the agent device 140 in the signal flow. The package PKG #3 installed on the agent device 130 is a downstream package with respect to the package PKG #1 installed on the agent device 140.

If a failure occurs in the agent device 140 and the alarm notification LOS (WDM LOS shown in FIG. 6) is detected, the alarm forwarding processor 120k of the agent device 140 refers to the alarm mask table 120g, and performs notification/non-notification setting for the alarm notifications LOS to T-OPT based on the in-package mask data, which is alarm mask type C predefined for the alarm notification LOS. Further, the alarm forwarding processor 120k of the agent device 140 sends the-agent device 130 a Set alarm mask request including the alarm mask type D based on the inter-package mask data for the alarm mask type C.

The alarm forwarding processor 120k checks whether non-notification setting for the received alarm notification is performed by the agent device 120, and, if non-notification setting is not performed, sends the alarm notification to the manager device 110. In the example shown in FIG. 6, non-notification setting is performed for the alarm notification LOS according to in-package mask data for the alarm mask type C, and therefore, the alarm forwarding processor 120k of the agent device 140 does not send the alarm notification to the manager device 110.

Upon receiving an alarm restoration notification from the alarm detecting unit 120h, the alarm forwarding processor 120k retrieves in-package mask data and inter-package mask data corresponding to the alarm mask type predefined for the alarm from the alarm mask table 120g. The alarm forwarding processor 120k performs notification/non-notification; cancellation setting in the agent device 120 based on the in-package mask data, and sends a Cancel alarm mask request to the downstream agent device based on the inter-package mask data to instruct the downstream agent device to perform notification/non-notification cancellation setting.

Upon receiving a Set alarm mask request from an agent device located upstream in the signal flow via the discovery processor 120i, the alarm forwarding processor 120k retrieves in-package mask data and inter-package mask data corresponding to the alarm mask type included in the received Set alarm mask request from the alarm mask table 120g. The alarm forwarding processor 120k performs notification/non-notification setting in the agent device 120 based on the in-package mask data, and sends the Set alarm mask request to the agent device located downstream based on the inter-package mask data.

Explaining with reference to FIG. 6, upon receiving a Set alarm mask request including the alarm mask type D from the agent device 140, the alarm forwarding processor 120k of the agent device 130 refers to the alarm mask table 120g. The alarm forwarding processor 120k retrieves in-package mask data for the alarm mask type D, and performs notification/non-notification setting of the alarm notification based on the retrieved in-package mask data. In FIG. 6, no agent device is set in the field of inter-package mask data in the alarm mask table 120g for the agent device 130 ("No agent" in FIG. 6). This indicates that there are no agent devices located downstream to the agent device 130 in the signal flow. Consequently, the alarm forwarding processor 120k does not send a Set alarm mask request to further downstream agent devices.

Upon receiving a Cancel alarm mask request from the agent device located upstream via the discovery processor 120i, the alarm forwarding processor 120k retrieves from the alarm mask table 120g in-package mask data and inter-package mask data corresponding to the alarm mask type included in the Cancel alarm mask request. Based on the in-package mask data, the alarm forwarding processor 120k performs notification/non-notification cancellation setting for alarm notification on the agent device 120, and, based on the inter-package mask data, sends the Cancel alarm mask request to the agent device installed with the downstream package. The alarm mask setting process and the alarm mask canceling process performed by the alarm forwarding processor 120k will be explained in detail later.

In the example presented here, only one package each is installed on the agent device 130 and the agent device 140 (PKG #3 and PKG #4). However, the agent devices 130 and 140 can have installed thereon a plurality of packages, wherein the inter-package correlation required for alarm mask setting is defined by the inter-package data contained in the respective alarm mask tables 120g of the agent devices 130 and 140.

Thus, the alarm mask table 120g stores therein the inter-package mask data. When a failure occurs, the alarm forwarding processor 120k performs, based on the inter-package mask data stored in the alarm mask table 120g, non-notification setting for alarm notification of secondary failure caused by the primary failure in the agent device installed with the downstream package. Consequently, the alarm mask condition, conventionally maintained beforehand by the manager device 110, can be autonomously decentralized and maintained by the agent devices connected via the internal LAN 150. Thereby, overloading of the network management device can be prevented with regard to failure monitoring.

In the example shown in FIG. 6, the alarm mask setting process is explained between the agent device 140 and the agent device 130. If each agent device builds its own alarm mask table 120g when activated, the alarm mask setting process can still be performed in accordance with the placement configuration of the agent devices even if the agent device 120 is placed between the agent device 140 and the agent device 130.

Figure 7:
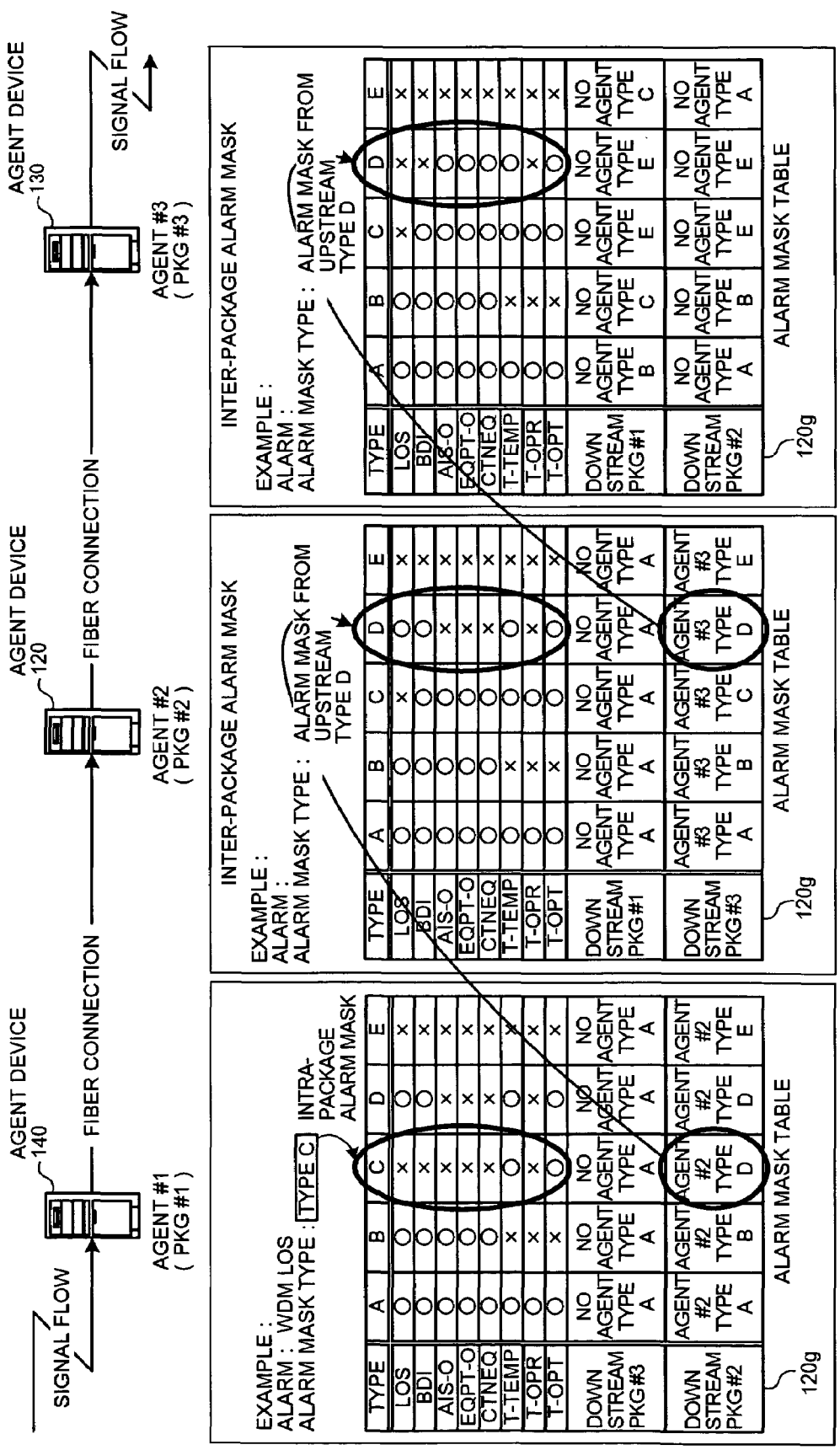
FIG. 7 is a schematic, for explaining the alarm mask setting process when an agent device is additionally connected between existing agent devices.

FIG. 7 is a schematic for explaining the alarm mask setting process when the agent device 120 (agent #2) is additionally connected between the existing agent devices 140 and 130 shown in FIG. 6. If a failure occurs in the agent device 140 and the alarm notification LOS is detected, the alarm forwarding processor 120k of the agent device 140 refers to in-package mask data corresponding to the alarm mask type C predefined for the alarm notification LOS, and performs notification/non-notification setting for the alarm notifications LOS to T-OPT. Further, the alarm forwarding processor 120k refers to inter-package mask data for PKG #2 and the alarm mask type C, and sends the agent device 120 a Set alarm mask request including the alarm mask type D.

Upon receiving the Set alarm mask request from the agent device 140, the alarm forwarding processor 120k of the agent device 120 refers to the alarm mask table 120g, retrieves in-package mask data for the alarm mask type D included in the received Set alarm mask request, and performs notification/non-notification setting of the alarm notification based on the retrieved in-package mask data. In addition, the alarm forwarding processor 120k of the agent device 120 refers to inter-package mask data for PKG #3 and the alarm mask type D, and sends the agent device 130 the Set alarm mask request including the alarm mask type D.

Upon receiving the Set alarm mask request including the alarm mask type D from the agent device 120, the alarm forwarding processor 120k of the agent device 130 refers to the alarm mask table 120g and retrieves therefrom in-package mask data for the alarm mask type D included in the received Set alarm mask request, and performs notification/non-notification setting of the alarm notification based on the retrieved in-package mask data.

In the example presented here, only one package each is installed on the agent device 120, the agent device 130, and the agent device 140 (PKG #2, PKG #3, and PKG #4). However, the agent devices 120, 130, and 140 can have installed thereon a plurality of packages, wherein the inter-package correlation required for alarm mask setting is defined by the inter-package data contained in the respective alarm mask tables 120g of the agent devices 120, 130, and 140.

Thus, when the agent device starts up, the signaling/routing processor 120a performs signaling and checks the connection status of the agent device with the other agent devices connected via the internal LAN 150. If a failure is detected, the alarm forwarding processor 120k performs, based on the connection status with the other agent devices checked by the signaling/routing processor 120a, non-notification setting for alarm notification of secondary failure caused by the primary failure in the other agent devices located downstream of the signal flow. Consequently, even if the placement configuration of the agent devices connected via the internal LAN 150 changes, alarm masking can be carried out in accordance with the new placement configuration of the agent devices.

Figure 8:
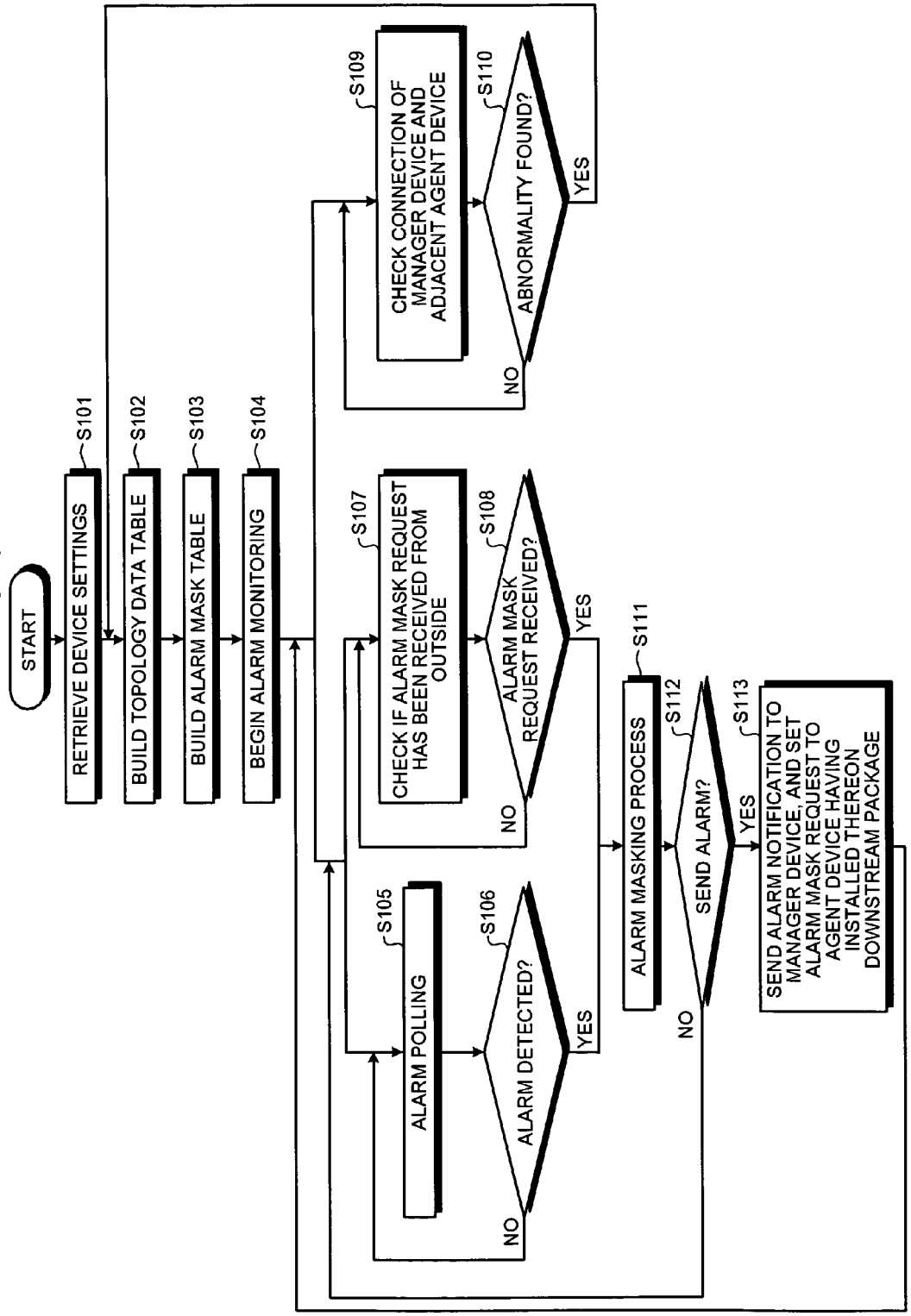
FIG. 8 is a flowchart of the operation of the agent device according to the embodiment.

FIG. 8 is a flowchart of the operation of the agent device 120. Upon startup of the agent device 120, the signaling/routing processor 120a retrieves the device settings from the device settings table 112 of the manager device 110 (step S101), and builds the topology data table 120b by signaling with the other agent devices (step S102).

The alarm-hierarchy building unit 120f builds the alarm mask table 120g based on the alarm mask template stored in the alarm-hierarchy data table 120c and the topology data stored in the topology data table 120b (step S103).

The agent device 120 then begins alarm monitoring (step S104). The alarm detecting unit 120h performs alarm polling (step S105), the discovery processor 120i checks whether any Set alarm mask request has been received from the outside (step S107), and the connection checking processor 120j checks the connection of the agent device. 120 with the manager device 110 and the other agent devices (step S109), all performed concurrently.

If the alarm detecting unit 120h receives an alarm notification (Yes at step S106), or if the discovery processor 120i receives a Set alarm mask request from an agent device installed with the upstream package (Yes at step S108), the alarm forwarding processor 120k performs the alarm mask setting process on the agent device 120 based on the alarm mask data stored in the alarm mask table 120g (step S111).

The alarm forwarding processor 120k then checks whether non-notification setting of the received alarm notification has been performed on the agent device 120 (step S112). If no non-notification setting has been performed (YES at step S112), the alarm forwarding processor 120k sends the alarm notification to the manager device 110, and sends the Set alarm mask request to the agent device installed with the downstream package with respect to the package installed on the agent device 120 (step S113).

If non-notification setting has been performed (No at step S112), the alarm forwarding processor 120k does nothing further and waits until the alarm detecting unit 120h receives an alarm notification or the discovery processor 120i receives a Set alarm mask request from another agent device.

If any abnormality is detected in the connection of the agent device 120 with the manager device 110 or another agent device (Yes at step S110), the connection checking processor 120j determines that there is a change in the connection status of the agent device and returns the control to the signaling/routing processor 120a. The signaling/routing processor 120a performs signaling with the other agent devices and rebuilds the topology data table 120b (step S102). The steps from Step S103 onwards are repeated based on the rebuilt topology data table 120b.

The connection checking processor 120j periodically checks whether there is any change in the connection status of the agent device 120 with the other agent devices, which was checked by the signaling/routing processor 120a when the agent device 120 was activated. If any change is detected, the signaling/routing processor 120a once again checks the connection status of the agent device 120 with the other agent devices connected via the internal LAN 150. Consequently, even if there is a change in the placement configuration of the agent devices connected via the internal LAN 150 from the time of startup, alarm masking can be carried out dynamically in accordance with the placement configuration.

Figure 9:
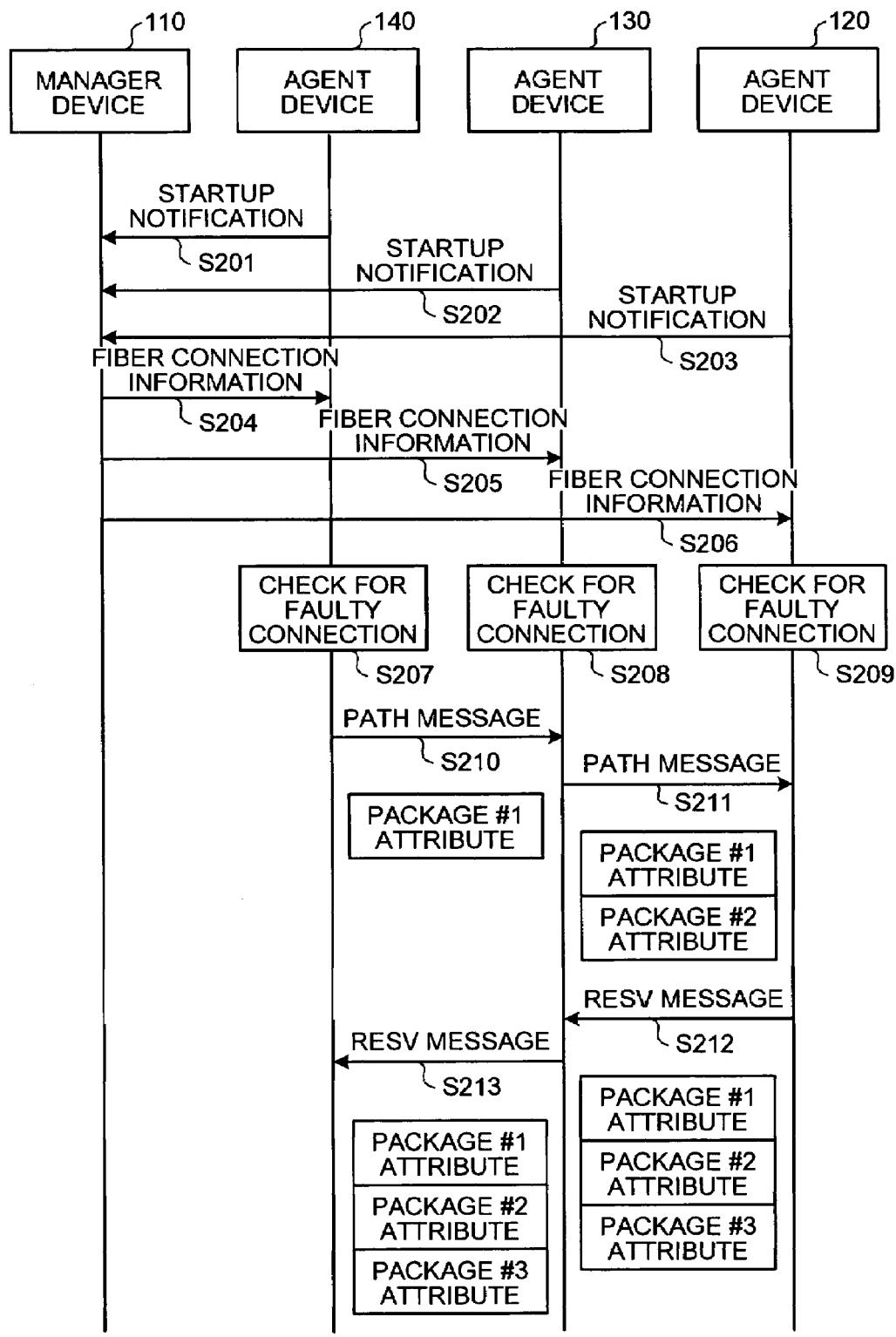
FIG. 9 is a sequence chart for explaining signaling performed by a signaling/routing processor shown in FIG. 2.

FIG. 9 is a sequence chart for explaining signaling performed by the signaling/routing processor 120a. At startup, each of the agent devices 120 to 140 sends a startup notification to the manager device 110 (steps S201 to S203).

Upon receiving the startup notifications, the manager device 110 sends each of the agent devices 120 to 140 the fiber connection information and the path information of the WDM device 100 (steps S204 to S206).

The agent devices 120 to 140 compare the received fiber connection information and information on the fiber actually connected, and check for any faulty connection (steps 207 to S209). If no faulty connection is detected, the agent devices 120 to 140 obtain the topology data of the control plane and store the topology data in the topology data table 120b.

The agent devices 120 to 140 perform a self-check to determine whether they are located at the topmost position in the signal flow based on the path information received from the manager device 110. If we assume that the agent device 140 is located at the topmost position in the signal flow, the agent device 140 sends the agent device installed with the downstream package (the agent device 130 in FIG. 9), based on the topology data of the control plane, a Path message (Package #1 Attribute shown in FIG. 9), including the attribute data of the package installed on the agent device 140 (step S210).

Upon receiving the Path message from the agent device 140, the agent device 130 adds its own package attribute data (Package #2 Attribute shown in FIG. 9) to the package attribute data included in the received Path message, and sends the Path message to the agent device installed with the downstream package (the agent device 120 in FIG. 9) (step S211).

If the agent device 120 is located at the bottommost position in the signal flow, upon receiving the Path message from the agent device 130, the agent device 120 adds its own package attribute data (Package #3 Attribute shown in FIG. 9) to the package attribute data included in the received Path message, and sends a resulting Resv message to the agent device 130 (step S212).

Upon receiving the Resv message from the agent device 120, the agent device 130 stores the package attribute data included in the Resv message in the topology data table 120*b* as the topology data, and sends the Resv message to the agent device 140 located upstream (step S213).

Upon receiving the Resv message from the agent device 130, the agent device 140 stores the package attribute data in the topology data table 120*b* as the topology data.

Thus, the signaling/routing processor 120*a* performs signaling when the agent device starts up and checks the connection status of the agent device with the other agent devices connected via the internal LAN 150, thereby enabling the alarm forwarding processor 120*k* to send a Set alarm mask request to the agent device installed with the downstream package to instruct the agent device to perform non-notification setting for alarm notification. Further, even if there is a change in the placement configuration of the agent devices, alarm masking can be performed in accordance with the new placement configuration.

Figure 10:
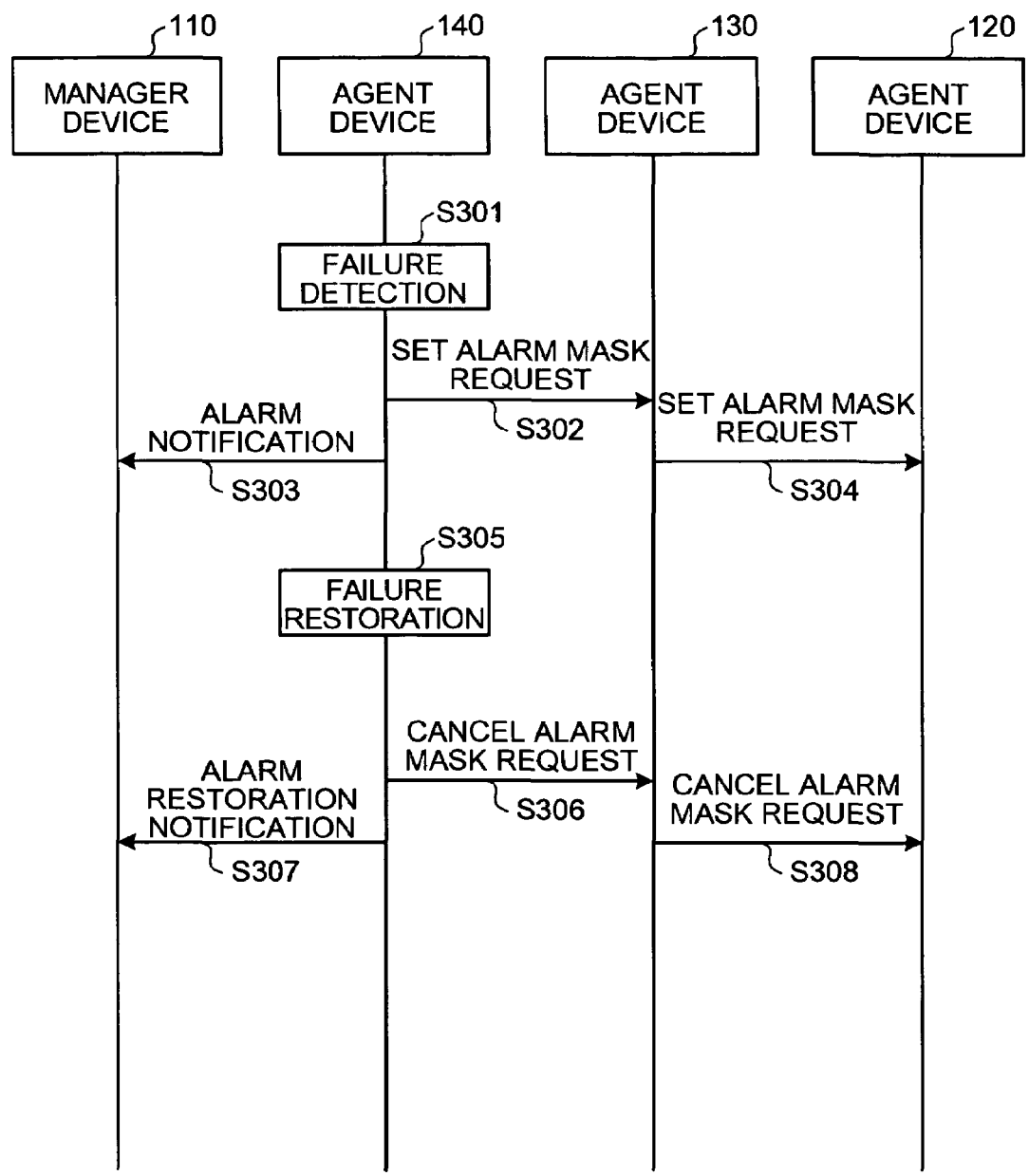
FIG. 10 is a sequence chart of an alarm mask setting process and an alarm mask canceling process.

The alarm mask setting process and the alarm mask canceling process performed by the alarm forwarding processor 120*k* is explained next. FIG. 10 is sequence chart of the alarm mask setting process and the alarm mask canceling process.

If a failure occurs in the agent device 140 (step S301), the alarm forwarding processor 120*k* performs non-notification setting for alarm notification based on the detected alarm notification, and sends a Set alarm mask request to the agent device 130 located downstream to the agent device 140 in the path set in the WDM device 100 (step S302). Further, the alarm forwarding processor 120*k* sends the alarm notification to the manager device 110 (step S303).

Non-notification setting for the alarm notification is performed in the agent device 130 based on the Set alarm mask request received from the agent device 140, and the Set alarm mask request is sent to the agent device 120 (step S304).

Non-notification setting for the alarm notification is performed in the agent device 120 based on the Set alarm mask request received from the agent device 130.

If the failure in the agent device 140 is restored (step S305), the alarm forwarding processor 120*k* cancels the non-notification setting for the alarm notification based on detected alarm restoration notification, and sends a Cancel alarm mask request to the agent device 130 located downstream to the agent device 140 in the path set in the WDM device 100 (step S306). Further, the alarm forwarding processor 120*k* sends the alarm restoration notification to the manager device 110 (step S307).

The non-notification setting for the alarm notification is canceled in the agent device 130 based on the Cancel alarm mask request received from the agent device 140, and the Cancel alarm mask request is sent to the agent device 120 (step S308).

The non-notification for the alarm notification is canceled in the agent device 120 based on the Cancel alarm mask request received from the agent device 130.

Thus, when a failure is restored, the alarm forwarding processor 120*k* cancels non-notification setting for alarm notification of secondary failure caused by the primary failure in the agent device installed with the downstream package. Thereby, alarm masking can be performed dynamically in accordance with the change in the failure status.

As described above, in the embodiment, when the alarm detecting unit 120*h* detects a failure, the alarm forwarding processor 120*k* checks whether non-notification setting has been performed for alarm notification of the failure. If no non-notification setting has been performed, the alarm forwarding processor 120*k* sends the alarm notification to the manager device 110, and, at the same time, sends a Set alarm mask request to the agent device installed with the downstream package to instruct the agent device to perform non-notification setting for alarm notification of secondary failure caused in the agent device by the primary failure. Thus, alarm masking, conventionally performed by the manager device 110, is performed autonomously and in a decentralized manner by the agent devices 120 to 140 connected via the internal LAN 150. As a result, overloading of the manager device 110 is prevented with regard to failure monitoring.

Further, the alarm mask condition, conventionally maintained beforehand by the manager device 110, can be autonomously decentralized and maintained in the alarm mask table 120*g* by the agent devices connected via the internal LAN 150. As a result, the need for upgrading the packages installed on the manager device, conventionally performed on upgrading the packages installed on the agent devices, is obviated. Consequently, the temporary interruption in monitoring of the network caused by the disconnection between the manager device and the monitor can be prevented.

The agent device, i.e., the information processing device, is explained above as hardware; however, it can be implemented in software. In other words, a computer program (hereinafter, "failure notification program") can be executed on the agent device to realize the same function as previously described. The agent device that executes the failure notification program is explained next.

Figure 11:
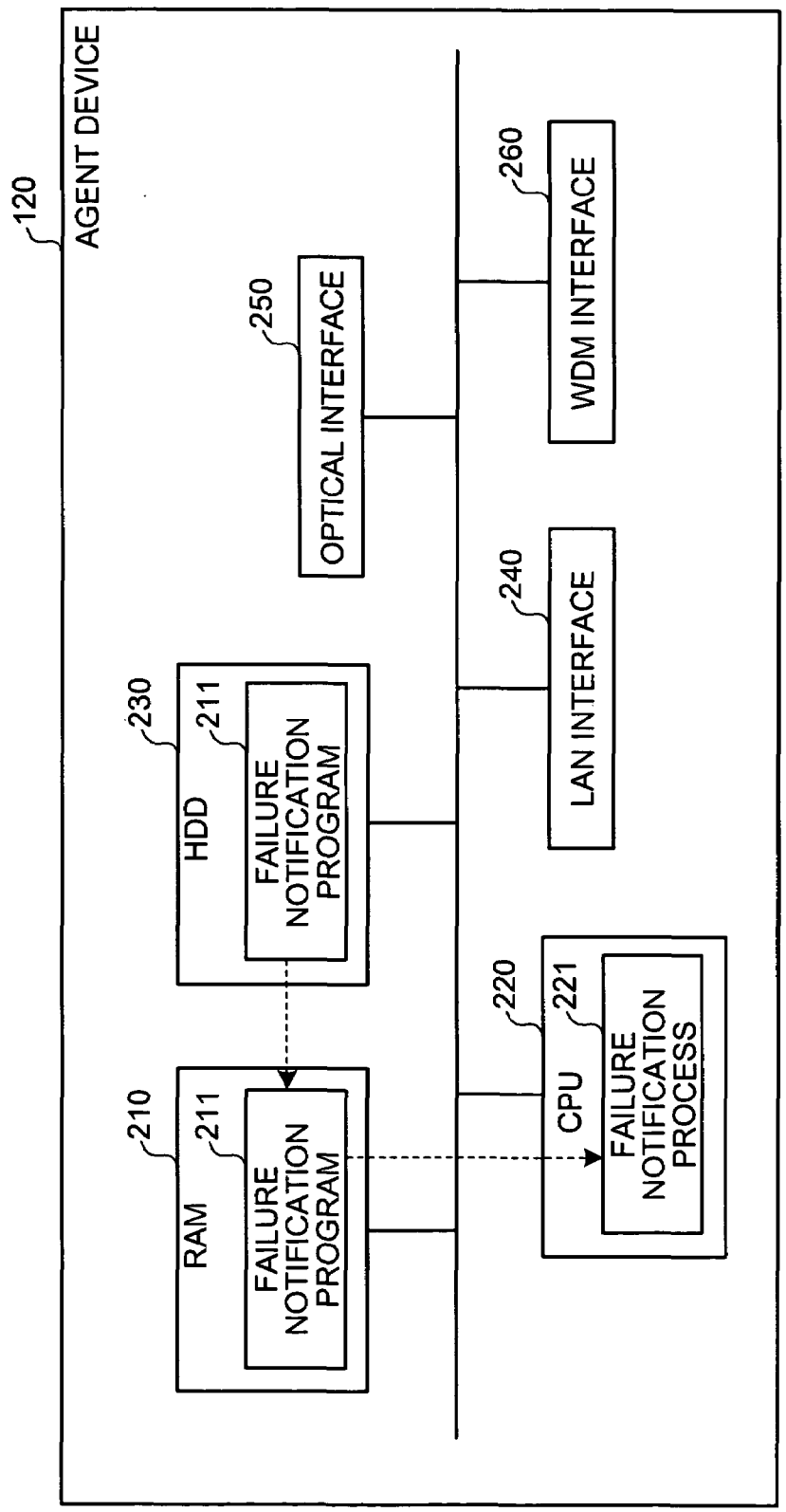
FIG. 11 is a block diagram of the agent device that executes a failure notification program.
Figure 12:
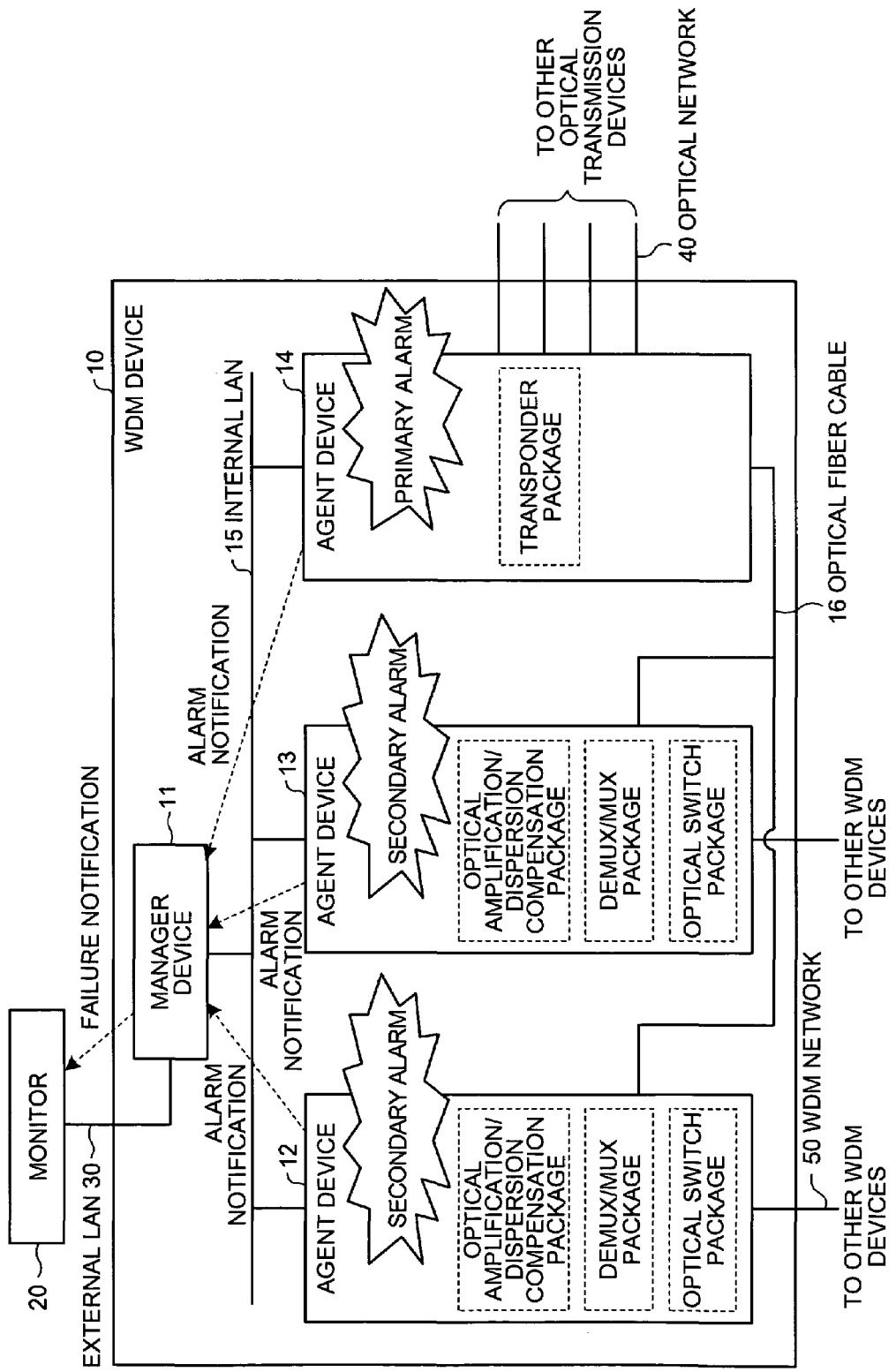
FIG. 12 is a schematic for explaining failure monitoring in a conventional WDM device.

FIG. 11 is a block diagram of the-agent device that executes the failure notification program according to an embodiment of the present invention. The agent device 120 includes a random access memory (RAM) 210, a central processing unit (CPU) 220, a hard disk drive (HDD) 230, a local area network (LAN) interface 240, an optical interface 250, and a wavelength division multiplexing (WDM) interface 260.

The RAM 210 is a memory that stores therein the program or the results of execution of the program. The CPU 220 reads and executes the program from the RAM 210.

The HDD 230 stores therein various programs and various types of data. The LAN interface 240 connects the agent device 120 to the other agent-devices via the LAN.

The optical interface 250 connects the agent device 120 to other optical transmitting devices via an optical network. The WDM interface 260 connects the agent device 120 to other WDM devices via an optical fiber cable.

A failure notification program 211 executed by the agent device 120 is installed on the agent device 120 by the manager device 110, etc., connected via the LAN interface 240.

The installed failure notification program 211 is stored in the HDD 230, and is loaded into the RAM 210 and executed as a failure notification process 221 by the CPU 220.

As set forth hereinabove, according to the present invention, when a primary failure occurs in an information processing device, the information processing device checks whether non-notification setting for the failure has been performed, and sends a failure notification of the primary failure to a network management device if no non-notification setting has been performed. In addition, the information processing device performs non-notification setting for failure notification of secondary failure, caused by the primary failure, in an information processing device located downstream in a signal flow in a network. Consequently, alarm masking, conventionally performed by the network management device, is performed autonomously and in a decentralized manner by the information processing devices connected to the network. Thereby, overloading of the network management device can be prevented with regard to failure monitoring.

Further, the information processing device checks the connection status with the other information processing devices in the network by signaling at startup. Upon occurrence of a failure, the information processing device performs non-notification setting for failure notification of secondary failure, caused by the primary failure, in the downstream information processing device based on the connection status. Consequently, even if there is a change in the placement configuration of the information processing devices in the network, alarm masking can be performed in accordance with the new placement configuration.

Still further, the information processing device stores failure non-notification setting data based on correlation of failures Upon occurrence of a failure, the information processing device performs non-notification setting for failure notification of secondary failure, caused by the primary failure, in the downstream information processing device based on the failure non-notification setting data. Consequently, alarm masking condition, conventionally maintained by the network management device, is autonomously decentralized and maintained by the information processing devices connected to the network. Thereby, overloading of the network management device can be prevented with regard to failure monitoring.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device in a network in which a plurality of information processing devices and a network management device are connected to one another, and the information processing device sends a failure notification to the network management device when a failure occurs, the information processing device comprising:
    a non-notification setting checking unit that, upon occurrence of a primary failure, checks whether non-notification setting has been performed for the primary failure;
    a failure notification forwarding unit that sends a failure notification to the network management device when the non-notification setting checking unit determines that the non-notification setting has not been performed; and
    a failure non-notification setting unit that, upon occurrence of the primary failure, performs non-notification setting for a secondary failure, caused by the primary failure, in another information processing device that sends a failure notification for the secondary failure to the network management device and the another information processing device is located downstream of a signal flow in the network.

2. The information processing device according to claim 1, further comprising a connection status checking unit that checks a connection status with the other information processing devices in the network by signaling when the information processing device is activated, wherein
    the failure non-notification setting unit performs the non-notification setting for the secondary failure based on the connection status determined by the connection status checking unit.

3. The information processing device according to claim 1, further comprising a failure non-notification setting data storing unit that stores therein failure non-notification setting data based on correlation of the primary failure and the secondary failure, wherein
    the failure non-notification setting unit performs the non-notification setting for the secondary failure based on the failure non-notification setting data stored in the failure non-notification setting data storing unit.

4. The information processing device according to claim 2, further comprising a connection status change checking unit that periodically checks whether there is any change in the connection status determined by the connection status checking unit when the information processing device is activated, wherein
    the connection status checking unit rechecks the connection status with the other information processing devices in the network if the connection status change checking unit determines that there has been a change in the connection status.

5. The information processing device according to claim 1, further comprising a failure non-notification canceling unit that, upon restoration of the primary failure, cancels the non-notification setting for the secondary failure.

6. A failure notification method applied to an information processing device in a network in which a plurality of information processing devices and a network management device are connected to one another, and the information processing device sends a failure notification to the network management device when a failure occurs, the failure notification method comprising:
    checking, upon occurrence of a primary failure, whether non-notification setting has been performed for the primary failure;
    sending a failure notification to the network management device when the non-notification setting has not been performed; and
    performing, upon occurrence of the primary failure, non-notification setting for a secondary failure, caused by the primary failure, in another information processing device that sends a failure notification for the secondary failure to the network management device and the another information processing device is located downstream of a signal flow in the network.

7. The failure notification method according to claim 6, further comprising checking a connection status with the other information processing devices in the network by signaling when the information processing device is activated, wherein
    the non-notification setting is performed for the secondary failure based on the connection status.

8. A computer-readable storage medium that stores therein a computer program executed on an information processing device in a network in which a plurality of information processing devices and a network management device are connected to one another, and the information processing device sends a failure notification to the network management device when a failure occurs, the failure notification program causing the information processing device to perform:
    checking, upon occurrence of a primary failure, whether non-notification setting has been performed for the primary failure;

sending a failure notification to the network management device when the non-notification setting has not been performed; and performing, upon occurrence of the primary failure, non-notification setting for a secondary failure, caused by the primary failure, in another information processing device that sends a failure notification for the secondary failure to the network management device and the another information processing device is located downstream of a signal flow in the network.

9. The computer-readable storage medium according to claim 8, wherein the computer program further causes the information processing device to perform checking a connection status with the other information processing devices in the network by signaling when the information processing device is activated, and the non-notification setting is performed for the secondary failure based on the connection status.

* * * * *